July 14, 1936.　　F. W. DWYER ET AL　　2,047,407
GAS TESTING DEVICE
Filed Dec. 22, 1933
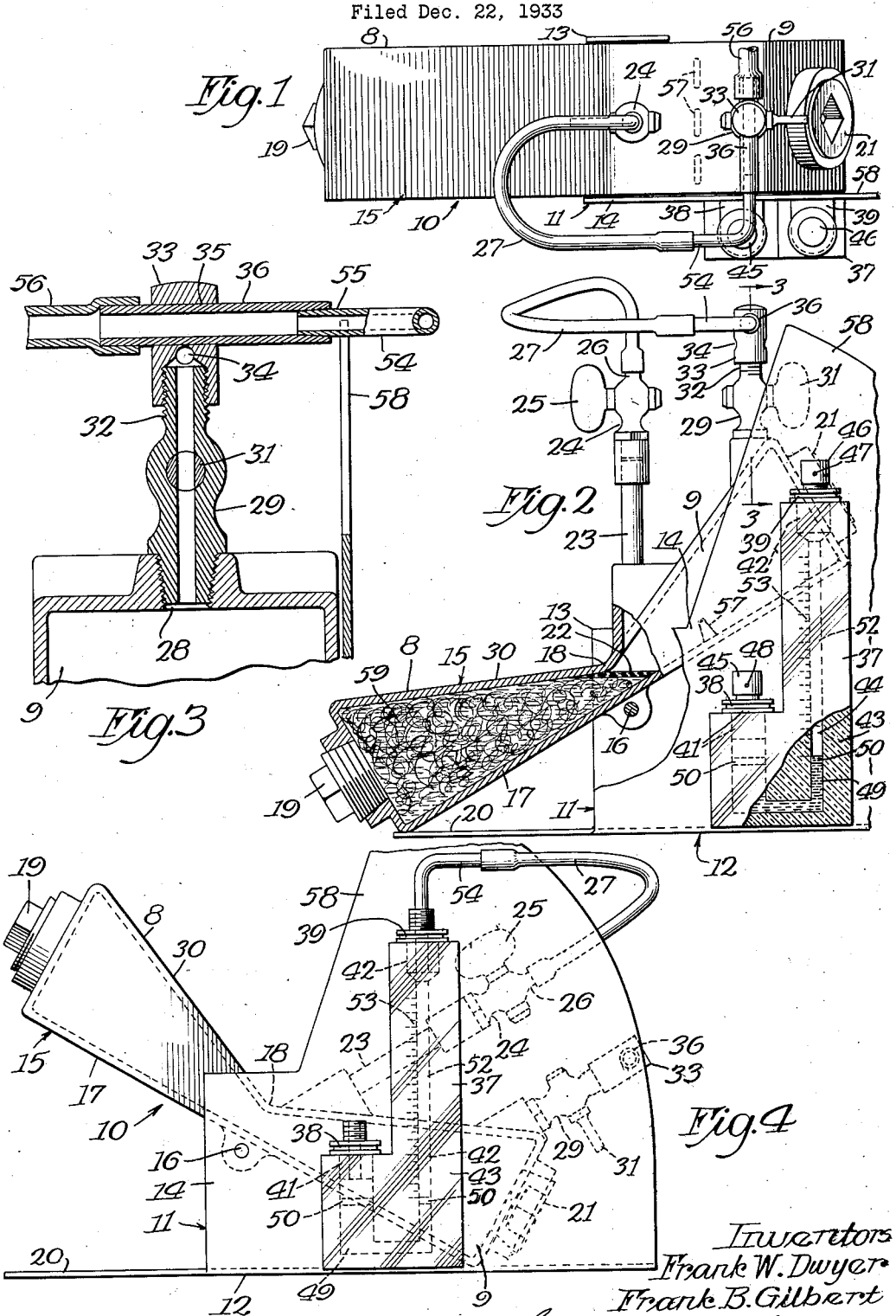
Inventors
Frank W. Dwyer
Frank B. Gilbert Patented July 14, 1936

2,047,407

UNITED STATES PATENT OFFICE 2,047,407

GAS TESTING DEVICE

Frank W. Dwyer, Chicago, and Frank B. Gilbert, Hinsdale, Ill.

Application December 22, 1933, Serial No. 703,594

9 Claims. (Cl. 23—254)

This invention relates to fluid testing devices.

The principal object of the invention is the provision of a new and improved testing device for determining the amount of a given kind of gas a mixture of two or more gases.

Another object of the invention is the provision of a new and improved gas testing device having novel means for mounting and operating the same.

A further object of the invention is the provision of a new and improved device for determining the percentage or relative amount of carbon dioxide gas in a mixture of this and other gases.

A further object of the invention is the provision of a new and improved method of testing certain types of gases for determining the proportionate amount of carbon dioxide gas therein.

A still further object of the invention is the provision of a new and improved gas testing device that is simple in construction, inexpensive to manufacture, efficient in operation, easily manipulated and which is not likely to become broken or get out of repair.

Other and further objects and advantages of the invention will appear from the following description, taken in connection with the accompanying drawing, in which—

Fig. 1 is a plan view of the device;

Fig. 2 is a side elevation thereof with parts in section and parts broken away showing the parts in position to be connected up with a pump, or the like;

Fig. 3 is a section on the line 3—3 of Fig. 2; and

Fig. 4 is a side elevation of the device, showing the same in connection with a pressure gauge.

Referring now to the drawing, the reference character 10 designates generally a testing device which comprises a base 11 of any suitable construction. In the form of construction shown, which is by way of example only, the base is formed from sheet metal bent to U-form having the horizontal portion forming the base 12 and the upstanding arm portions or side walls 13 and 14 (see Fig. 2). The base 12 may if desired have an extension 20 to add stability to the device. The side wall 14 is extended upwardly to form a guard, as will presently appear.

A suitable receptacle 15 comprising a body portion having its central part restricted is pivoted between its ends, as at 16, to the arms 13 and 14. The receptacle 15 is preferably constructed with its bottom wall 17 straight and its upper wall 30 angular to form the restricted portion 18 that divides the receptacle or body portion into two communicating chambers 8 and 9. The chamber 9, which is normally uppermost, will, for convenience of description, be termed the upper chamber. The pivot 16 will permit the reversal of the chambers, that is, the receptacle may be tilted about the pivot 16 so that the chamber that is normally below the other will be above the same. The ends of the receptacle are provided with openings closed by the plugs 19 and 21, respectively.

The receptacle is adapted to contain a suitable chemical that will react on the gas to be tested whereby the change in pressure due to this reaction may be employed in a pressure gauge to indicate the percentage of the gas in the mixture tested. The present invention is especially adapted for testing the amount of carbon dioxide ($CO_2$) in furnace flues or chimneys. A suitable chemical for reacting on the carbon dioxide is caustic potash (KOH) and a solution of this chemical is introduced into the receptacle through the opening at either end thereof by removing the plug 19 or the plug 21. A sufficient amount of this solution is introduced to bring the level of the liquid slightly below the restricted portion 18, as clearly shown in Fig. 2 of the drawing.

The upper wall 30 is so constructed that it will slant upwardly from which ever end is down. By this arrangement, an air trap is avoided in the lower chamber and the liquid will occupy the entire chamber that is tilted down. The restricted portion causes agitation when the receptacle is tilted.

A small amount of oil 22 is introduced to form a layer above the liquid caustic, as shown in Fig. 2. This layer of oil functions to isolate the chemical from gas in the upper portion of the receptacle until it is disrupted by tilting the device 15 about its pivot 16. This layer of oil prevents the gas from prematurely coming into contact with the liquid chemical. Since the oil occupies a position at the restricted portion of the receptacle, only a small amount is necessary. The chamber 9 of the receptacle 15 is provided with an inlet in which is secured a tube 23 having a valve member 24 attached to its upper end. The member 24 has a valve 25 therein for opening and closing said inlet. The upper portion of the valve member 24 is provided with a nipple 26 to which is attached a flexible tube 27 of rubber, or other suitable material.

The chamber 9 is also provided with an outlet 28 in which is secured the tubular member 29.

This outlet is at the uppermost portion of the chamber when the chamber is tilted up, as shown in Fig. 2 of the drawing, in order that the gas will not be trapped above the outlet during the use of the device.

The member 29 above the valve 31 is provided with a reduced threaded portion 32 to which is attached a discharge nozzle block 33. The block 33 is provided with a transverse opening 35 in which is secured a tube 36, the ends of which extend to each side of said block.

A suitable pressure gauge 37 is provided for indicating the pressure within the receptacle when the gas to be tested is brought into intimate contact with the chemical contained in said receptacle. This gauge may be of any suitable construction, and is preferably though not necessarily, connected to the arm 14 of the support.

The gauge may be secured in position in any suitable manner. As shown, plates 38 and 39 extending laterally from the arm 14 which engage plugs 41 and 42 secured in the body of the gauge are employed for this purpose.

The gauge may be of any suitable form of construction. That shown comprises a transparent body portion 43 having a U-shaped bore 44 therein. Plugs 41 and 42 engage in the upper arms of the U-shape bore 44 and are provided with caps 45 and 46 having small air openings 47 and 48, respectively. When the plugs are screwed down tightly, they will seal the bore 44 and when they are partially unscrewed from the plugs, the openings 47 and 48 will be uncovered, thus placing the ends of the bore in communication with the air. The bore 44 preferably contains mercury 49. A layer of colored liquid is introduced above the mercury 49 in both arms of the U-shaped bore. This colored liquid will not only protect the mercury from being contaminated by the air, but will indicate at a glance the height of the mercury in the bore. The arm 52 of the bore 44 is preferably of smaller diameter than the other arm and is calibrated to indicate on a scale 53 the percentage of $CO_2$, or other gas that is being tested.

Suitable means are provided for connecting the tubular member 27 with the tube 36 in the block 33. As shown, a connector 54 is employed for this purpose. The connector 54 is preferably angular, and has one end secured in the tube 27 and its other end, tapered as at 55, is adapted to be inserted in the free end of the tube 36.

In the operation of the device, the gases to be tested are pumped through the upper chamber 9 of the receptacle 15 a sufficient length of time to insure a displacement of the air therein. The gas to be tested is pumped by any suitable mechanism through the conduit 56 from the chimney or flue. This gas passes from the conduit 56 through the tube 36, connector 54, tube 27 and valve 25 through the inlet into the upper chamber of the receptacle. It is discharged through the outlet into the tube 29 past the valve 31 and expelled through the discharge opening 34. After the gas to be tested has displaced the air in the upper chamber of the receptacle, the valve 25 is then closed which will permit the gas in the upper portion of the receptacle to return to atmospheric pressure after which the valve 31 is closed and the connector 54 disengaged from the tube 36.

In order to bring the gas into intimate contact with the testing fluid in the lower portion of the receptacle, the receptacle is now tilted which will cause the oil film or layer 22 to be ruptured, and the liquid will flow through the restricted opening into the opposite end of the receptacle. The movement through the restricted opening will not only disrupt the oil film or layer, but will cause considerable agitation, thereby causing intimate mixture of the liquid and the gas. If desired, a suitable number of baffles 57 for increasing the agitation of the liquid when the receptacle is tilted may be employed. The receptacle is then tilted to its former position which causes a further intermingling of the gas and liquid. The cap 46 of the gauge is removed and the connector 54 engaged therewith. The cap 45 is unscrewed sufficiently to permit the entrance of air through the opening 48, after which the valve 25 is opened, and since the pressure in the upper end of the receptacle 15 is below that of the atmosphere due to the reaction of the liquid on the carbon dioxide during the tilting operations, the mercury in the arm 52 will rise and the reading on the scale 53 will indicate the percentage of carbon dioxide in the gas tested.

In order to prevent the introduction of gas to be tested when the chamber 9 is tilted down, the arm 14 of the U-shaped support may be extended upwardly and rearwardly, as at 58, so that when the device is in the position shown in Fig. 4, the connector member 54 cannot be attached to the block 33 and when it is attached, the chamber 9 cannot be tilted down because of the engagement of the connector with the extension 58.

This is considered an important feature of the invention for the reason that if the gas could be introduced into the receptacle when the same is tilted to the position shown in Fig. 4, the liquid would be forced outwardly through the discharge opening, and not only lost but also possibly injure the hands or clothing of the operator. Furthermore, more or less of the liquid would adhere to the inner surface of the tube 29 and interfere with the test, due to fact that the liquid retained in the tube would react on the gas prematurely.

In order to insure a complete displacement of the gas contained within the chamber 9 the inlet for introducing the gas to be tested is located adjacent the restricted portion above the level of the liquid absorbent and the discharge opening is located adjacent the uppermost portion of said chamber. By this arrangement, any of the liquid absorbent that may be splashed into the inlet or inlet pipe 23 will be blown back into the receptacle by the gas when the same is introduced into the chamber 9.

While caustic potash is mentioned as the gas absorbent liquid used, it is understood that other liquids may be employed, depending on the nature of the gases to be tested, the cost of materials, convenience of charging the device, the reaction on the material of the receptacle and the like.

The chamber 8 is preferably though not necessarily provided with some neutral material not affected by the caustic potash that is porous or the mass of which is porous, such as steel wool 59 or other material for increasing the surface to be exposed to the gas when the reservoir is tilted. The steel wool very materially increases the surface wet with the caustic solution so that when the device is tilted, practically all the gas to be tested immediately comes into contact with the solution adhering to the surface of the wool particles and to the walls of the receptacle, with the result that the reaction is practically complete within an incredibly short time.

The operation of the device is the same as that described above—that is, after the gas to be tested is forced into the chamber 9 and the valves 25 and 31 closed, the device is tilted which causes the liquid in the chamber 8 to displace the gas in chamber 9. The gas in chamber 9 flows into chamber 8 and reacts on the chemical adhering to the steel wool 59 and to the side walls of the chamber. The device is now tilted to its original position, the connector 54 attached to the gauge, the valve 25 opened and the reading taken.

Where the wool or other porous mass or material is not used, it requires more time for the reaction to be completed, but the result is the same. When the steel wool or other porous mass or material is used, the baffles 57 are unnecessary.

It is thought from the foregoing taken in connection with the accompanying drawing that the construction and operation of our device will be apparent to those skilled in the art, and that changes in size, shape, proportion and details of construction may be made without departing from the spirit and scope of the appended claims.

We claim as our invention:

1. In combination, a support, a gauge on said support, a receptacle having a straight bottom wall and an angular top wall forming a restricted portion in said receptacle, means for pivotally connecting said restricted portion to said support with one end of said receptacle in elevated position, a caustic solution in the lower end of said receptacle and filling the same to said restricted portion, a layer of oil on said solution, means for introducing a gas to be tested into the empty portion of said receptacle to the exclusion of the air therein, means for placing said empty portion in communication with said gauge, and a gas outlet on the upper end of said receptacle.

2. A gas detector device, comprising a support, a receptacle pivoted to said support, said receptacle comprising a body portion having a chamber at each end thereof, a restricted passage between said chambers, a solution of an alkaline caustic filling one of said chambers up to said restricted passage, a film of oil in said passage supported on said liquid, means for introducing a gas to be tested into the chamber not occupied by said liquid whereby when said chambers are inverted, a mingling of said gas and liquid will be affected and means for indicating the decrease in pressure in said receptacle when said gas and liquid have intermingled.

3. A gas detector device comprising a receptacle having a restricted central portion forming a chamber at each end, a support, means adjacent to said restricted portion for pivotally connecting the same to said support above the base of said support whereby said receptacle may be tilted one end above the other, caustic potash in one of said chambers, baffle means in the other of said chambers adjacent said restricted portion, means including conduits for introducing and discharging gas from said baffle containing chamber, means for preventing contact of said gas and potash until said receptacle is tilted and means for indicating the pressure of gas in said receptacle.

4. A gas detector device comprising a support, a gauge on said support, a receptacle adapted to contain a caustic liquid in a normally lower portion thereof for testing carbon dioxide gas, means for pivotally connecting said receptacle to said support whereby one portion of said receptacle may be elevated above the other and said liquid caused to flow downwardly into the lowered portion, a discharge and an intake tube on the normally elevated portion of said receptacle and projecting from the upper wall thereof, said intake tube being adjacent the pivotal axis of said receptacle and said discharge tube being at the normally upper end of said receptacle, a short pipe extending transversely through the upper end of said discharge tube, one end of said pipe being adapted to be attached to a pump for forcing a gas into said receptacle, connector means for selectively connecting said intake tube in communication with said pipe or with said gauge.

5. A gas testing device comprising a support, a receptacle, means for pivotally connecting said receptacle to said support at an elevated position on said support whereby said receptacle may be tilted to a position with either end of the same above the other, means providing a passage through the upper wall of the normally upper portion of said receptacle for admitting a gas to be tested, means providing a second passage through the upper wall of the normally upper portion of said receptacle for the escape of air from said receptacle, a chemical for reacting on said gas in the normally lower portion of said receptacle and a neutral liquid between said chemical and gas.

6. A gas detector device comprising a receptacle adapted to contain a caustic liquid for testing carbon dioxide gas, a support, means for pivotally mounting said receptacle on said support along the base thereof whereby said receptacle may be tilted to positions with either end above the other, means for introducing gas to be tested into one end of said receptacle and means for preventing tilting of said receptacle, said last named means being operative only when said second named means is in position for introducing gas into said receptacle.

7. A gas detector comprising a container including a pair of chambers movable together, a support, means for pivotally connecting said container to an elevated position on said support so arranged that when either chamber is tilted upward the other will be tilted downward, a liquid substance in one of said chambers that will chemically react with carbon dioxide gas, means for introducing a gas to be tested into the other of said chambers, a neutral liquid for separating said gas and substance, and means including a narrow passage between said chambers having a cross section materially less than that of said chambers for conducting gas into the chamber containing said substance when the chamber containing said gas is tilted downwardly.

8. A gas detector comprising a support, a container member comprising a pair of chambers, one of said chambers containing a liquid substance that will chemically react with carbon dioxide gas, means for conducting carbon dioxide gas to and from the other of said chambers, a restricted passage between said chambers having a cross section materially less than that of said chambers, a neutral liquid in said passage for separating the two chambers, means between said chambers pivotally connecting the container member to an elevated point on said support so arranged that when either chamber is tilted upward the other will be tilted downward, and means for causing said carbon dioxide gas to intermingle with said substance upon the tilting of said container member.

9. A gas testing device comprising a container including a pair of chambers in communication with each other through a restricted passage having a cross section materially less than that of said chambers, a support, means for pivotally connecting said chambers to said support in such manner that when one chamber is tilted to its uppermost position the other will be tilted to its lowermost position, one of said chambers being normally in its lowermost position and having a liquid caustic composition therein that will chemically react with carbon dioxide gas, a neutral liquid in said restricted passage for separating said gas and composition, and means for causing an intimate intermingling of said gas and composition when the chamber containing said composition is tilted to its lowered position.

FRANK W. DWYER.
FRANK B. GILBERT.